United States Patent Office 3,631,034
Patented Dec. 28, 1971

3,631,034
DERIVATIVES OF 5-CINNAMOYL BENZOFURAN, THEIR PROCESS OF PREPARATION AND THEIR THERAPEUTIC UTILIZATION
Claude P. Fauran, 5 Rue Lebouteaux, and Guy M. Raynaud, 39 Rue Saint-Georges, both of Paris, France; Jeannine A. Eberle, 106C Rue Leon Barbier, Chatou, France; and Bernard M. Pourrias, 36 Allee-du-Mail, Meudon-la-Foret, France
No Drawing. Filed June 27, 1969, Ser. No. 837,342
Claims priority, application Great Britain, July 6, 1968, 32,383/68
Int. Cl. C07d 5/36
U.S. Cl. 260—240 J    6 Claims

ABSTRACT OF THE DISCLOSURE

Compounds of the formula

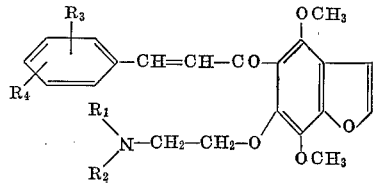

in which $R_1$ and $R_2$ each are
(1) an alkyl radical having 1 to 4 carbon atoms, or
(2) together with the nitrogen atom to which they are attached for heterocyclic radical $R_3$ and $R_4$ represent a hydrogen atom, an alkyl radical having 1–5 carbon atoms, a halogen atom, an alkoxy radical or a trifluoromethyl radical.

The compounds are made by reacting, in an alkaline medium and in an alcoholic solvent, an ether amine of khellinone with an aromatic aldehyde. The compounds exhibit hypotensive activity, vasodilatory activity, spasmolytic activity and an effect on the capillary permeability.

---

The present invention relates to novel derivatives of 5-cinnamoyl benzofuran, their process of preparation and their therapeutic utilization.

The compounds according to the present invention correspond to the general Formula I:

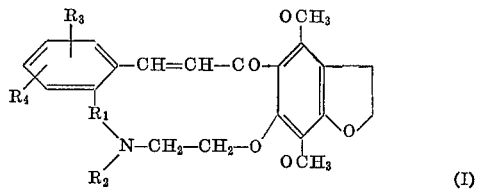

in which:

$R_1$ and $R_2$ each represent an alkyl radical having 1 to 4 carbon atoms, or together with the nitrogen atom to which they are attached, form a heterocyclic radical such as a pyrrolidine, piperidine, morpholine, perhydroazepine or piperazine radical; and $R_3$ and $R_4$, which may be the same or different, each represent a hydrogen atom, an alkyl radical having 1 to 5 carbon atoms, a halogen atom, an alkoxy radical or a trifluoromethyl radical.

The process for the preparation of the compounds of the present invention comprises reacting, in an alkaline medium and in an alcoholic solvent, a suitable ether amine of khellinone of the general Formula II

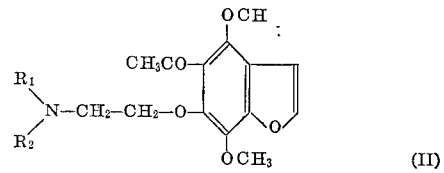

with a suitable aromatic aldehyde of the general Formula III:

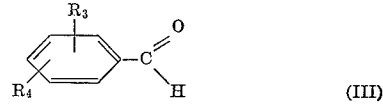

In Formulas II and III, $R_1$, $R_2$, $R_3$ and $R_4$ have the same signification as in Formula I.

After the reaction has finished, the mixture is diluted with water, extracted with ether or chloroform, and the extract so obtained is washed with water, dried and the solvent is evaporated. The crystallized residue is recrystallized in a solvent such as isopropyl ether, isopropyl alcohol or ethyl acetate.

In order to obtain a compound which will crystallize very satisfactorily, the maleate can be formed by reacting the base, purified and dried, with an equimolar quantity of maleic acid in ethyl acetate. The maleate is precipitated by the addition of sulphuric ether or petroleum ether, and is recovered by filtering and drying.

The following preparations are given as non-limitative examples to illustrate the present invention.

EXAMPLE 1

5 - cinnamoyl - 4,7 - dimethoxy - 6 - dimethylaminoethoxy benzofuran maleate

To a solution of 0.15 mol of 5-acetyl-4,7-dimethoxy-6-dimethylaminoethoxy benzofuran and 0.14 mol of benzaldehyde in 400 ml. of ethanol, 140 ml. of 50% soda is added dropwise whilst maintaining the temperature of the reaction mixture at 20° C. The mixture is agitated for 4½ hours and is then poured into a litre of water. The mixture is then extracted with ether, washed with water and dried over sodium sulphate. The solvent is evaporated and the residue is recrystallized in isopropyl ether. 48 g. of the desired product is obtained.

Yield=80%; melting point=73° C.

Elementary analysis.—Empirical formula=$C_{23}H_{25}NO_5$. Calculated (percent): C, 69.85; H, 6.37; N, 3.54. Found (percent): C, 70.00; H, 6.60; N, 3.73.

10.6 g. of maleic acid in 50 ml. of ethanol are added to 40 g. of the base obtained above in 100 ml. of ethanol. The mixture is left for 1 hour. The solvent is then evaporated and the residue is extracted three times with anhydrous alcohol and the solvent is evaporated to dry the product. The residue is dissolved, whilst warm, in a minimum of 50 ml. of ethyl acetate and is recrystallized by the addition of 50 ml. of petroleum ether with agitation .35 g. of the desired product is obtained.

Yield=70%; melting point=88° C.

Elementary analysis.—Empirical formula=$C_{27}H_{29}NO_9$. Calculated (percent): C, 63.39; H, 5.71; N, 2.74. Found (percent): C, 63.35; H, 5.74; N, 2.70.

EXAMPLE 2

5-cinnamoyl-4,7-dimethoxy-6-diethylaminoethoxy benzofuran maleate

To a solution of 0.13 mol of benzaldehyde and 0.14 mol of 5-acetyl-4,7-dimethoxy-6-diethylaminoethoxy benzofuran in 340 ml. of ethanol, 135 ml. of 50% soda is added dropwise whilst maintaining the temperature of the reaction mixture at 20° C.

During the course of the addition of the soda, an orange precipitate is formed. The mixture is left at ambient temperature for 4½ hours and is then poured into 800 ml. of water. A yellow-orange product is precipitated, filtered, dissolved in 400 ml. of chloroform, washed with water until neutral and dried. After evaporation under vacuum and recrystallization in isopropyl ether, 36 g. of the desired product is obtained.

Yield=82%; melting point=80° C.

*Elementary analysis.*—Empirical formula=$C_{25}H_{29}NO_5$. Calculated (percent): C, 70.90; H, 6.90; N, 3.31. Found (percent): C, 70.94; H, 6.67; N, 3.34.

0.07 mol of maleic acid in 180 ml. of ethyl acetate is added to 0.07 mol of the base obtained above in 100 ml. of ethyl acetate. The maleate is precipitated by the addition of 210 ml. of ether. The maleate crystallizes, is filtered whilst cold, washed in an ether-ethyl acetate mixture and dried under vacuum.

Yield=77%; melting point=90° C.

*Elementary analysis.*—Empirical formula=$C_{29}H_{33}NO_9$. Calculated (percent): C, 64.55; H, 6.17; N, 2.60. Found (percent): C, 64.42; H, 6.11; N, 2.58.

EXAMPLE 3

5-cinnamoyl-4,7-dimethoxy-6-morpholinoethoxy benzofuran

To a solution of 0.08 mol of benzaldehyde and 0.084 mol of 5-acetyl-4,7-dimethoxy-6-morpholinoethoxy benzofuran in 200 ml. of ethanol, 80 ml. of 50% soda is added dropwise whilst maintaining the temperature of the reaction mixture at 20° C. The mixture is left at ambient temperature for 4½ hours and is then poured into 500 ml. of water. A white solid is obtained which is extracted with 400 ml. of chloroform, washed with water, dried over sodium sulphate, evaporated and the residue is recrystallized in ethyl acetate.

Yield=95%; melting point=110–112° C.

*Elementary analysis.*—Empirical formula=$C_{25}H_{27}NO_6$. Calculated (percent): C, 68.63; H, 6.22; N, 3.20. Found (percent): C, 68.70; H, 6.26; N, 3.28.

EXAMPLE 4

5-cinnamoyl-4,7-dimethoxy-6-pyrrolidinoethoxy benzofuran maleate

To a solution of 0.17 mol of benzaldehyde and 0.16 mol of 5-acetyl-4,7-dimethoxy-6-pyrrolidinoethoxy benzofuran in 420 ml. of ethanol, 174 ml. of 50% soda is added dropwise whilst maintaining the temperature of the reaction mixture at 20° C. The mixture is left at ambient temperature for 4½ hours, and is then poured into 1100 ml. of water. The precipitate formed is extracted with chloroform, washed with water, dried and evaporated. The residue is recrystallized in isopropyl alcohol.

Yield=84%; melting point=79° C.

*Elementary analysis.*—Empirical formula=$C_2$-$H_{27}NO_5$. Calculated (percent): C, 71.24; H, 6.46; N, 3.32. Found (percent): C, 71.34; H, 6.66; N, 3.18.

0.092 mol of the base obtained above in 185 ml. of ethyl acetate is treated with a solution of 0.092 mol of maleic acid in 230 ml. of ethyl acetate. Sufficient ether is then added to the mixture to cause precipitation. The maleate crystallizes, is filtered whilst cold and is washed on the filter with a mixture of equal volumes of ether and ethyl acetate. The residue is dried under vacuum at 50° C.

Yield=82%; melting point=100° C.

*Elementary analysis.*—Empirical formula=$C_{29}H_{31}NO_9$. Calculated (percent): C, 64.79; H, 5.81; N, 2.61. Found (percent): C, 64.70; H, 5.93; N, 2.65.

EXAMPLE 5

5-(p-methoxy-cinnamoyl)-4,7-dimethoxy-6-dimethyl-aminoethoxy benzofuran maleate To a solution of 6.5 g. of p-methoxy-benzaldehyde and 15.3 g. of 5-acetyl-4,7-dimethoxy-6-dimethylaminoethoxy benzofuran in 100 ml. of ethanol, 50 ml. of 50% soda is added dropwise whilst maintaining the temperature of the reaction mixture at 20° C.

The mixture is left for 3 hours under agitation and is then poured into 250 ml. of water, extracted with ether and washed with water. The mixture is dried, evaporated and the oily residue is treated with warm heptane in order to obtain a clear yellow solution. A red oil is removed by decanting. The solution is allowed to recrystallize and 10 g. of the desired product is obtained.

Yield=46.5%; melting point=88° C.

*Elementary analysis.*—Empirical formula=$C_{24}H_{27}NO_6$. Calculated (percent): C, 67.75; H, 6.40; N, 3.29. Found (percent): C, 67.78; H, 6.52; N, 3.31.

0.01 mol of maleic acid in solution in 10 ml. of ethanol is added to 0.01 mol of the base obtained above in 10 ml. of warm ethanol. The maleate crystallizes in 24 hours and is separated by filtration, washed with a little alcohol and dried.

Melting point=128–129° C.

*Elementary analysis.*—Empirical formula=$C_{28}H_{31}NO_{10}$. Calculated (percent) C, 62.10; H, 5.77; N, 2.59. Found (percent): C, 62.30; H, 5.55; N, 2.55.

EXAMPLE 6

5-(p-fluorocinnamoyl)-4,7-dimethoxy-6-dimethylamino-ethoxybenzofuran maleate To a solution of 5.9 g. of p-fluorobenzaldehyde and 15.1 g. of 5-acetyl-4,7-dimethoxy-6-dimethylaminoethoxy benzofuran in 100 ml. of ethanol, 50 ml. of 50% soda is added whilst ensuring that the temperature of the reaction mixture does not rise above 20° C. The mixture is left for 3 hours under agitation and is then poured into 250 ml. of water. The mixture is extracted with ether, washed with water, dried, evaporated and recrystallized twice in heptane. The maleate is prepared as in Example 5 and is recrystallized in a little ethyl acetate.

Melting point=136° C.

*Elementary analysis.*—

Empirical formula=$C_{27}H_{28}FNO_9$

Calculated (percent): C, 61.24; H, 5.33; N, 2.65. Found (percent): C, 61.81; H, 5.43; N, 2.82.

EXAMPLE 7

5-(3′,4′-dichlorocinnamoyl)-4,7-dimethoxy-6-dimethyl-aminoethoxy benzofuran maleate To a solution of 129 g. of 5-acetyl-4,7-dimethoxy-6-dimethylaminoethoxybenzofuran and 70 g. of 3,4-dichlorobenzaldehyde in 1000 ml. of ethanol, 400 ml. of 50% soda is added whilst maintaining the temperature of the reaction mixture at 20° C. The mixture is left for 3 hours and is then poured into 3 litres of water and extracted with ether. The ether extract is recovered by the addition of a 1/10 solution of acetic acid, washed with water, neutralized using sodium bicarbonate in powder form, rendered alkaline by the addition of the little ammonia, extracted with ethyl acetate and washed with water. The product is then dried, evaporated and recrystallized in heptane.

Yield=50%.

*Elementary analysis.*—

Empirical formula=$C_{23}H_{23}Cl_2NO_5$

Calculated (percent): C, 59.69; H, 4.99; H, 3.02; Cl, 15.27. Found (percent): C, 59.66; H, 5.17; N, 2.94; Cl, 15.57.

0.166 mol of maleic acid in 20 ml of alcohol is added to 0.169 mol of the base prepared above in solution in 80 ml. of absolute alcohol. The maleate crystallizes on cooling and is isolated by filtration and dried over potassium hydroxide.

Yield=63%; melting point=123° C.

EXAMPLE 8

5-(3′,4′-dimethoxycinnamoyl)-4,7-dimethoxy-6-dimethylaminoethoxy benzofuran

To a solution of 8 g. of 3,4-dimethoxy benzaldehyde and 15.3 g. of 5-acetyl-4,7-dimethoxy-6-dimethylaminoethoxy benzofuran in 100 ml. of ethanol, 50 ml. of 50% soda is added whilst maintaining the temperature of the reaction mixture at 20° C. The mixture is left for 3 hours under agitation and is then poured into 250 ml. of water. The mixture is threafter extracted three times with ether, washed three times with water, dried, evaporated, taken up in ether, extracted with 1/10 dilute acetic acid, washed three times with ether, rendered alkaline by the addition of acid sodium carbonate and dilute ammonia. The mixture is then extracted with ether, washed with water, dried and evaporated. After about 2 days the product crystallizes.

Yield (crude)=44%. The product is taken up in warm heptane and recrystallizes on cooling. Melting point= 92° C.

*Elementary analysis.—*

Empirical formula=$C_{25}H_{29}NO_7$

Calculated (percent): C, 65.92; H, 6.42; N, 3.08. Found (percent): C, 66.03; H, 6.63; N, 3.22.

EXAMPLE 9

5-cinnamoyl-4,7-dimethoxy-6-perhydroazepino ethoxy benzofuran

This compound is prepared according to the processes described in the preceding examples by reacting 37 g. of 5 - acetyl-4,7-dimethoxy-6-perhydroazepinoethoxy benzofuran with 11.7 g. of benzaldehyde in the presence of 50% soda. The crude product is recrystallized in isopropyl ether.

Yield=45%; melting point=65° C.

*Elementary analysis.—*

Empirical formula=$C_{27}H_{31}NO_5$

Calculated (percent): C, 72.14; H, 6.95; N, 3.12. Found (percent): C, 72.00; H, 6.81; N, 3.23.

On studying the compounds of Formula I on laboratory animals, they have been shown in exercise a hypotensive, vasodilatatory and spasmolytic action as also effecting the capillary permeability.

(1) Hypotensive activity

The intravenous or intraduodenal administration of the compounds of the present invention on the anaesthetized rat and cat provokes a reduction in the arterial pressure.

By way of example, the results obtained with two of the compounds of Formula I are shown in the following table

TABLE 1

| $R_1=R_2$ | $R_3=R_4$ | Salt | Animal treated | Dose administered, mg./kg | Method of administration | Arterial pressure Reduction registered, percent | Duration of hypertension. mn, |
|---|---|---|---|---|---|---|---|
| —CH₃ | —H | Maleate | Cat | 1 | I.v. | 40 | 30 |
|  |  |  | Rat | 2 | I.v. | 50 | 10 |
|  |  |  |  | 5 | I.v. | 70 | 30 |
| —C₂H₅ | —H | ...do | Rat | 2 | I.v. | 50 | 15 |

(2) Vasodilatatory activity

The intra-arterial injection of the compounds of Formula I into the femoral artery of the rabbit, cat or dog, provoke an augmentation of the output of blood.

The vasodilatatory activity is estimated by measuring the output of perfusion of a physiological solution (in the case of a rabbit) or with the aid of rotameter (in the case of a dog).

The results obtained with two of the compounds of Formula I are shown in the following table.

TABLE 2

| $-N\begin{smallmatrix}R_1\\R_2\end{smallmatrix}$ | $R_3$ | $R_4$ | Salt | Animal treated | Dose administered, μg./kg. | Method of administration | Augmentation of output of peripheric blood, percent |
|---|---|---|---|---|---|---|---|
| —N(pyrrolidine) | H | H | Maleate | Rabbit | 50 | I.a. | 50 |
|  |  |  |  | ...do | 100 | I.a. | 100 |
| —N(CH₃)₂ | 3-Cl | 4-Cl | ...do | Dog | 25 | I.a. | 100 |

(3) Spasmolytic activity

The spasmolytic activity has been studied on the isolated duodenum of the rat, as opposed to the contractions provoked by barium chloride (papaverinic activity) or by acetylcholine (atropinic activity).

The results obtained with three of the compounds of Formula I are shown in the following table:

TABLE 3

| $R_1=R_2$ | $R_3$ | $R_4$ | Salt | Activity shown with regard to that exercised by — Papaverine | Atropine |
|---|---|---|---|---|---|
| —CH₃ | —H | —H | Maleate | 5 | 1/200 |
| —CH₃ | —4—OCH₃ | H | ...do | 3 | 1/10 |
| —CH₃ | —4—F | H | ...do | 2.5 | 1/250 |

(4) Effect on the capillary permeability

The action on the capillary permeability has been studied on the anaesthetised rat and guinea pig by the test of the intradermic papula with histamine. The products preventively administered by oral means differ the appearance of colouring (blue trypan) injected by intraperitoneal means into the papules.

The results obtained with two of the compounds of Formula I are shown in the following table:

TABLE 4

| $-N\begin{matrix}R_1\\R_2\end{matrix}$ | $R_3$ | $R_4$ | Animal treated | Dose administered, mg./kg./SC [1] | Diminution of capillary permeability, percent |
|---|---|---|---|---|---|
| $-N\bigcirc O$ (morpholinyl) | H | H | Rat | 5 | 100 |
| $-N(CH_3)_2$ | 3'-OCH₃ | 4'-OCH₃ | Guinea pig | 5 | 70 |

[1] Maleic solution.

Considering the results of Table 5 following and those of preceding Tables 1 to 4, the difference between the lethal dose and the pharmacological activity is sufficiently large to enable the compounds of the Formula I to be utilised as therapeutics.

TABLE 5

| $-N\begin{matrix}R_1\\R_2\end{matrix}$ | $R_3$ | $R_4$ | Form | Method of administration | $DL_{50}$ mg./kg. (mouse) |
|---|---|---|---|---|---|
| $-N(CH_3)_2$ | H | H | Maleate | I.v. P.o. | 14 138 |
| $-N(C_2H_5)_2$ | H | H | Maleate | P.o. | 150 |
| $-N\bigcirc O$ | H | H | Base | P.o. | 375 |
| $-N\square$ (pyrrolidinyl) | H | H | Maleate | I.v. P.o. | 10 250 |
| $-N(CH_3)_2$ | 4-OCH₃ | H | Maleate | P.o. | 250 |
| $-N(CH_3)_2$ | 4-F | H | Maleate | P.o. | 430 |
| $-N(CH_3)_2$ | 3-Cl | 4-Cl | Maleate | I.v P.o. | 24 320 |
| $-N(CH_3)_2$ | 3-Cl | 4-Cl | Base | P.o. | 400 |

The compounds of Formula I may be administered for the treatment of cerebral arteriopathy, arteritis, vasomotor troubles affecting hands, feet or skin. They are equally effective in indicating vasculary troubles, namely capillary fragilities.

They may be administered in the form of tablets or drinkable ampoules containing 10 to 250 mg. of active ingredient, in the form of drops containing 10 to 250 mg. of active ingredient per ml. and in the form of injectable ampoules containing 1 to 100 mg. of active ingredient.

What we claim is:
1. A compound of the formula:

$$R_4\text{-}\underset{R_1}{\underset{|}{\bigcirc}}\text{-}CH=CH\text{-}CO\text{-}\underset{OCH_3}{\underset{|}{\bigcirc}}\text{-}O\text{-}CH_2\text{-}CH_2\text{-}N\begin{matrix}R_1\\R_2\end{matrix}$$

with $R_3$ on the phenyl ring and OCH₃ groups on the furan-containing ring.

in which:
   $R_1$ and $R_2$ each represent an alkyl radical having 1 to 4 carbon atoms, or $-N\begin{matrix}R_1\\R_2\end{matrix}$ is a radical selected from the group consisting of pyrrolidinyl, piperidyl, morpholinyl, perhydroazepinyl and piperazinyl; and
   $R_3$ and $R_4$, which may be the same or different, each is selected from the group consisting of hydrogen, an alkyl radical having 1 to 5 carbon atoms, halogen, a lower alkoxy radical and a trifluoromethyl radical; and the pharmaceutically acceptable acid addition salts thereof.

2. A compound as claimed in claim 1 in which $R_1$ and $R_2$ each is selected from the group consisting of methyl and ethyl.

3. A compound as claimed in claim 1 in which $-N\begin{matrix}R_1\\R_2\end{matrix}$ is selected from the group consisting of pyrrolidinyl, piperidyl, morpholinyl, perhydroazepinyl.

4. A compound as claimed in claim 1 in which at least one of $R_3$ and $R_4$ is methoxy.

5. A compound as claimed in claim 1 in which at least one of $R_3$ and $R_4$ is fluorine.

6. A compound as claimed in claim 1 in which at least one of $R_3$ and $R_4$ is chlorine.

References Cited

FOREIGN PATENTS 3,925 2/1966 France ........... 260—346.2 R
1,415,355 9/1965 France ........... 260—346.2 R

OTHER REFERENCES

Chemical Abstracts I, vol. 53, cols. 18939 to 18940 (1959) (abstracts of Musante).

Chemical Abstracts II, vol. 65, cols. 3823 to 3825 (1966) (abstract of Mustafa et al.).

JOHN D. RANDOLPH, Primary Examiner

U.S. Cl.X.R.

424—244, 248, 250, 267, 285